US010595553B2

(12) United States Patent
Gupta et al.

(10) Patent No.: US 10,595,553 B2
(45) Date of Patent: *Mar. 24, 2020

(54) NUTRITIONAL SUPPLEMENT POWDER

(71) Applicant: ABBOTT LABORATORIES, Abbott Park, IL (US)

(72) Inventors: Rockendra Gupta, Columbus, OH (US); Gaurav Patel, Gahanna, OH (US); Normanella Dewille, Columbus, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 239 days.

This patent is subject to a terminal disclaimer.

(21) Appl. No.: 15/949,619

(22) Filed: Apr. 10, 2018

(65) Prior Publication Data

US 2018/0279662 A1 Oct. 4, 2018

Related U.S. Application Data

(63) Continuation of application No. 15/128,537, filed as application No. PCT/US2015/022025 on Mar. 23, 2015, now Pat. No. 9,968,123.

(60) Provisional application No. 61/970,509, filed on Mar. 26, 2014.

(51) Int. Cl.
| | | |
|---|---|---|
| A23L 33/21 | (2016.01) | |
| A23L 33/00 | (2016.01) | |
| A23L 33/12 | (2016.01) | |
| A23L 33/15 | (2016.01) | |
| A23L 33/16 | (2016.01) | |
| A23L 33/17 | (2016.01) | |
| A23L 33/18 | (2016.01) | |
| A23L 33/19 | (2016.01) | |

(52) U.S. Cl.
CPC ............ *A23L 33/21* (2016.08); *A23L 33/12* (2016.08); *A23L 33/15* (2016.08); *A23L 33/16* (2016.08); *A23L 33/17* (2016.08); *A23L 33/18* (2016.08); *A23L 33/19* (2016.08); *A23L 33/40* (2016.08); *A23V 2002/00* (2013.01); *H05K 999/99* (2013.01)

(58) Field of Classification Search
CPC .......... A23L 33/12; A23L 33/19; A23L 33/21; A23V 2200/202
USPC ................. 426/72, 73, 74, 580, 648, 656
See application file for complete search history.

(56) References Cited

U.S. PATENT DOCUMENTS

| | | |
|---|---|---|
| 3,814,820 A | 6/1974 | Busta et al. |
| 4,710,387 A | 12/1987 | Uiterwaal et al. |
| 4,737,364 A | 4/1988 | Kalogris |
| 6,592,863 B2 | 7/2003 | Fuchs et al. |
| 6,630,178 B1 | 10/2003 | Hoie |
| 6,887,850 B2 | 5/2005 | Fuchs et al. |
| 7,758,893 B2 | 7/2010 | Hageman et al. |
| 8,137,718 B2 | 3/2012 | Russell et al. |
| 8,293,264 B2 | 10/2012 | Rosales et al. |
| 8,518,469 B2 | 8/2013 | MacDonald et al. |
| 9,968,123 B2 | 5/2018 | Gupta et al. |
| 2002/0064578 A1 | 5/2002 | Henry et al. |
| 2006/0083824 A1 | 4/2006 | Manning et al. |
| 2008/0003265 A1 | 1/2008 | Casey et al. |
| 2008/0171720 A1 | 7/2008 | Garssen et al. |
| 2008/0305212 A1 | 12/2008 | Wong et al. |
| 2009/0082249 A1 | 3/2009 | Garssen et al. |
| 2011/0097442 A1 | 4/2011 | Harju et al. |
| 2012/0121562 A1 | 5/2012 | Bergonzelli Degonda et al. |
| 2017/0172196 A1 | 6/2017 | Gupta et al. |

FOREIGN PATENT DOCUMENTS

| | | |
|---|---|---|
| CN | 101317684 | 12/2008 |
| CN | 101744054 A | 6/2010 |
| CN | 103125602 A | 6/2013 |
| CN | 103478547 A | 1/2014 |
| WO | 9731546 | 9/1997 |
| WO | 2004075653 | 9/2004 |
| WO | 2005013721 | 2/2005 |
| WO | 2007039596 | 4/2007 |
| WO | 2007070611 | 6/2007 |
| WO | 2012143402 | 10/2012 |

OTHER PUBLICATIONS

Office Action in Canadian Patent Application No. 2,942,555 dated May 28, 2018.
Notice of Eligibility for Grant and Examination Report in Singapore Patent Application No. 11201607831T dated May 26, 2018.
International Search Report for PCT/US15/022025 dated Jun. 16, 2015.
International Preliminary Report on Patentability for PCT/US15/022025 dated Sep. 27, 2016.
Office Action in Vietnam Patent Application No. 1-2016-03827 dated Nov. 25, 2016.
Barber et al., "Fish Oil-Enriched Nutritional Supplement Attenuates Progression of the Acute-Phase Response in Weight-Losing Patients with Advanced Pancreatic Cancer," J. Nutr. (1999), vol. 129, pp. 1120-1125.
Invitation to Respond to Search Report and Written Opinion in Singapore Patent Application No. 11201607831T dated Oct. 5, 2017.

(Continued)

*Primary Examiner* — Helen F Heggestad
(74) *Attorney, Agent, or Firm* — Calfee, Halter & Griswold LLP

(57) ABSTRACT

A nutritional supplement powder and method of supplementing the nutritional value of a food or beverage is provided. The nutritional supplement powder includes a protein system, vitamins, minerals, and fiber. The protein system has a water solubility of at least about 70% at room temperature. The nutritional supplement powder is essentially free of divalent ions of copper, iron, and zinc, and is also essentially free of vitamin C. When added to a food or beverage, the nutritional supplement powder does not substantially change the organoleptic properties of the food or beverage.

20 Claims, No Drawings

(56) References Cited

OTHER PUBLICATIONS

Office Action in Canadian Patent Application No. 2,942,555 dated Sep. 26, 2017.
Office Action in Israel Patent Application No. 247464 dated Nov. 23, 2017.
Office Action in U.S. Appl. No. 15/128,537 dated Sep. 18, 2017.
Notice of Allowance in U.S. Appl. No. 15/128,537 dated Feb. 7, 2018.
Communication Pursuant to Article 94(3) EPC from European Patent Application No. 15715057.4 dated Jan. 29, 2019.

NUTRITIONAL SUPPLEMENT POWDER

CROSS-REFERENCE TO RELATED APPLICATIONS

This application is a continuation of U.S. patent application Ser. No. 15/128,537, filed Sep. 23, 2016, which is the U.S. national stage entry of International Application No. PCT/US2015/022025, filed Mar. 23, 2015, which claims priority to and the benefit of U.S. Provisional Application No. 61/970,509, filed Mar. 26, 2014, the entire contents of which are incorporated herein by reference.

FIELD

The present disclosure relates to a nutritional supplement powder. More particularly, the present disclosure relates to a nutritional supplement powder for supplementing the nutritional value of a food or beverage without substantially changing the organoleptic properties of the food or beverage.

BACKGROUND

Proper nutrition is generally regarded as one of the key factors for achieving and maintaining good health. This is particularly true for infants and children as they grow and develop. However, children can be picky eaters, often preferring foods and beverages that are rich in simple sugars and starch. Typically, these children-preferred foods and beverages are lower in, or completely lack, the essential nutrients needed to support optimal growth and development of children.

SUMMARY

Disclosed herein are nutritional supplement powders and methods of supplementing the nutritional value of a food or beverage. To illustrate various aspects of the present disclosure, several exemplary embodiments of nutritional supplement powders and methods of supplementing the nutritional value of a food or beverage are provided herein.

In one exemplary embodiment, a nutritional supplement powder is provided. The nutritional supplement powder comprises a protein system, vitamins, minerals, and fiber. The protein system has a water solubility of at least about 70% at room temperature. In addition, the nutritional supplement powder is essentially free of (i) divalent ions of copper, iron, and zinc; and (ii) vitamin C.

In one exemplary embodiment, a nutritional supplement powder is provided. The nutritional supplement powder comprises a protein system, a polyunsaturated fatty acid, vitamins, minerals, and fiber. The protein system has a water solubility of at least about 70% at room temperature. In addition, the nutritional supplement powder is essentially free of (i) divalent ions of copper, iron, and zinc; and (ii) vitamin C.

In certain exemplary embodiments, the protein system comprises whey protein concentrate and milk protein concentrate. In certain exemplary embodiments, a weight ratio of the whey protein concentrate to the milk protein concentrate ranges from about 70:30 to about 90:10. In certain exemplary embodiments, a weight ratio of the whey protein concentrate to the milk protein concentrate is about 90:10. In certain exemplary embodiments, the whey protein concentrate is agglomerated whey protein concentrate. In certain exemplary embodiments, the milk protein concentrate is agglomerated milk protein concentrate.

In certain exemplary embodiments, a single serving size of about 5 grams to about 15 grams of the nutritional supplement powder provides less than about 60 kcal. In certain exemplary embodiments, the nutritional supplement powder has a water solubility of at least about 70%.

In one exemplary embodiment, a method of supplementing the nutritional value of a food or beverage is provided. The method includes adding a nutritional supplement powder to the food or beverage. The nutritional supplement powder comprises a protein system, vitamins, minerals, and fiber. The protein system has a water solubility of at least about 70% at room temperature. In addition, the nutritional supplement powder is essentially free of (i) divalent ions of copper, iron, and zinc; and (ii) vitamin C. Adding the nutritional supplement powder to the food or beverage does not substantially change the organoleptic properties of the food or beverage. For example, adding the nutritional supplement powder to the food or beverage does not substantially change the color of the food or beverage.

In one exemplary embodiment, a method of supplementing the nutritional value of a food or beverage is provided. The method includes adding a nutritional supplement powder to the food or beverage. The nutritional supplement powder comprises a protein system, a polyunsaturated fatty acid, vitamins, minerals, and fiber. The protein system has a water solubility of at least about 70% at room temperature. In addition, the nutritional supplement powder is essentially free of (i) divalent ions of copper, iron, and zinc; and (ii) vitamin C. Adding the nutritional supplement powder to the food or beverage does not substantially change the organoleptic properties of the food or beverage. For example, adding the nutritional supplement powder to the food or beverage does not substantially change the color of the food or beverage.

In certain exemplary embodiments of the method, the nutritional supplement powder is added to a food having a moisture content of about 1% to about 30% by weight of the food. In certain exemplary embodiments of the method, the nutritional supplement powder is added to a food having a moisture content of about 30% to about 90% by weight of the food. In certain exemplary embodiments of the method, a single serving size of about 5 grams to about 15 grams of the nutritional supplement powder is added to the food or beverage.

DETAILED DESCRIPTION

Disclosed herein are nutritional supplement powders and methods of supplementing the nutritional value of a food or beverage. While the present disclosure describes certain embodiments of the nutritional supplement powder and method in detail, the present disclosure is to be considered exemplary and is not intended to be limited to the disclosed embodiments.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a,"

"an," and "the" are inclusive of their plural forms, unless the context clearly indicates otherwise.

The nutritional supplement powders and corresponding manufacturing methods of the present disclosure can comprise, consist of, or consist essentially of the essential elements of the disclosure as described herein, as well as any additional or optional element described herein or which is otherwise useful in nutritional supplement applications.

All percentages, parts, and ratios as used herein are by weight of the total formulation, unless otherwise specified. All such weights as they pertain to listed ingredients are based on the active level and, therefore, do not include solvents or by-products that may be included in commercially available materials, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The term "protein system" as used herein, unless otherwise specified, refers to at least two different protein sources used in combination in the nutritional supplement powders described herein.

The terms "polyunsaturated fatty acid" and "PUFA" as used herein, unless otherwise specified, refer to a fatty acid having two or more points of unsaturation (i.e., two or more carbon-carbon double bonds), or a source thereof.

The term "fiber" as used herein, unless otherwise specified, refers to soluble dietary fiber. A non-limiting list of fiber includes fructooligosaccharide, inulin, modified corn dextrin, and modified wheat dextrin.

The term "essentially free" as used herein, unless otherwise specified, means that the nutritional supplement powder may include a trace amount, typically less than about 0.1 wt %, of a particular component. Such trace amounts of the component typically result from the component being inherently present in a required ingredient. In addition, the term "essentially free" should be understood to mean that the nutritional supplement powder is not manufactured utilizing a particular component. For example, a nutritional supplement powder that is essentially free of divalent ions of copper, iron, and zinc would not be manufactured using any of, for example, cupric sulfate, ferrous sulfate, and zinc sulfate.

The term "organoleptic" as used herein, unless otherwise specified, refers to a sensory property of a food or beverage such as taste, color, odor, and mouthfeel.

Nutritional supplement powders according to the present disclosure comprise a protein system, vitamins, minerals, and fiber. In certain exemplary embodiments, in addition to the protein system, vitamins, minerals, and fiber, the nutritional supplement powders according to the present disclosure comprise a polyunsaturated fatty acid. The protein system has a water solubility of at least about 70% at room temperature, which promotes the water solubility of the nutritional supplement powder. In addition, the nutritional supplement powder is essentially free of (i) divalent ions of copper, iron, and zinc; and (ii) vitamin C, which allows the nutritional supplement powder to have a more neutral or flavorless taste.

According to the methods disclosed herein, the nutritional supplement powder is added to a food or beverage to supplement the nutritional value of the food or beverage while not substantially changing the organoleptic properties of the food or beverage. To that end, the nutritional supplement powder comprises a combination of ingredients that result in a substantially colorless, flavorless powder while also providing a good source of protein, fiber, vitamins, and minerals.

Embodiments of the nutritional supplement powder described herein comprise a protein system having a water solubility of at least about 70% at room temperature. In this context, the term "room temperature" refers to a temperature range of about 20° C. to about 25° C. Utilizing a protein system having a water solubility of at least about 70% at room temperature ensures that the nutritional supplement powder adequately dissolves when added to a food or beverage such that the appearance, texture, and mouthfeel of the food or beverage does not substantially change. One of skill in the art may readily determine the water solubility of a protein system according to well known analytical methods. For example, the water solubility of the protein system may determined according to the following steps: (1) suspend the protein system at 2.00% (w/w) in water; (2) stir vigorously for one hour at 20° C. to form a suspension; (3) remove an aliquot of the suspension, and determine the protein concentration as total protein (e.g., via HPLC at 205 nm vs. a bovine serum albumin (BSA) reference solution); (4) centrifuge the suspension at 31,000 rpm and at 20° C. for one hour; (5) determine the protein concentration in the supernatant (the soluble protein); and (6) express the water solubility of the protein system as a percentage by dividing the soluble protein content in the supernatant by the total protein in the suspension.

In certain embodiments, the protein system comprises whey protein concentrate and milk protein concentrate. The whey protein concentrate provides excellent solubility, while the milk protein concentrate balances the whey off-notes to provide a more neutral, cleaner flavor. In certain embodiments, a weight ratio of the whey protein concentrate to the milk protein concentrate ranges from about 50:50 to about 90:10, including from about 60:40 to about 90:10, from about 70:30 to about 90:10, and also including from about 80:20 to about 90:10. The weight ratio of the whey protein concentrate to the milk protein concentrate ensures that the nutritional supplement powder has a neutral flavor and excellent dispersibility, water solubility, and pH compatibility with a wide variety of foods and beverages. In certain embodiments, the nutritional supplement powder includes a protein system comprising whey protein concentrate and milk protein concentrate, and the weight ratio of the whey protein concentrate to the milk protein concentrate is about 90:10.

In certain embodiments, the protein system comprises whey protein concentrate that is an agglomerated whey protein concentrate. In other embodiments, the protein system comprises milk protein concentrate that is an agglomerated milk protein concentrate. In yet other embodiments, the protein system comprises whey protein concentrate and milk protein concentrate, and the whey protein concentrate is an agglomerated whey protein concentrate and the milk protein concentrate is an agglomerated milk protein concentrate. Utilizing an agglomerated whey protein concentrate, an agglomerated milk protein concentrate, or both can improve the solubility and dispersibility of the nutritional supplement powder when added to a food or beverage.

The term "agglomerated" as used herein refers to a powder that is processed such that very small powder particles are fused together to form large agglomerates with limited points of contact between the particles so that most of the surface area of the agglomerate is available to wetting. The particle size of the agglomerates that comprise the agglomerated whey protein concentrate and agglomerated milk protein concentrate may vary widely, but is typically in the range of about 100 µm to about 1500 The agglomerated proteins described herein may be produced according to well known processes, such as agglomeration or instantization by spray lecithination. For example, in instantization by spray lecithination, a lecithin having a suitable hydrophilic-lipophilic balance (HLB) and viscosity is sprayed uniformly onto the surface of the powder in a fluid bed or dry blender.

A variety of whey protein concentrates and milk protein concentrates may be utilized for the protein system of the nutritional supplement powder described herein. An exemplary whey protein concentrate suitable for use in the nutritional supplement powder described herein is WPC 1056, an agglomerated whey protein concentrate, available from Fonterra Co-operative Group Limited (Auckland, New Zealand). An exemplary milk protein concentrate suitable for use in the nutritional supplement powder described herein is MPC 4861 available from Fonterra Co-operative Group Limited (Auckland, New Zealand).

In certain embodiments of the nutritional supplement powder, the amount of the protein system ranges from about 15 grams to about 20 grams per 100 kcal of the nutritional supplement powder. Alternatively, the amount of the protein system may be characterized as a weight percentage of the nutritional supplement powder. For example, in certain embodiments, the amount of the protein system in the nutritional supplement powder ranges from about 55 wt % to about 65 wt % based on the total weight of the nutritional supplement powder, including from about 60 wt % to about 65 wt %. In certain embodiments, the amount of the protein system is such that the nutritional supplement powder provides, per serving, from about 2.5 grams to about 7.5 grams of protein, including about 5 grams of protein. Accordingly, the nutritional supplement powder provides a good source of protein for supplementing foods and beverages that are low in or lack protein.

In certain exemplary embodiments, the nutritional supplement powder includes a polyunsaturated fatty acid (PUFA). The consumption of PUFAs, and particularly n-3 PUFAs, has been associated with a number of health benefits, including cognition and early brain development, as well as protection against cardiovascular disease. However, many individuals, and children in particular, do not consume an adequate amount of PUFAs in their normal diets. Accordingly, in certain exemplary embodiments, the nutritional supplement powder may be used to supplement foods or beverages that are low in or lack PUFAs.

In certain embodiments, the nutritional supplement powder comprises a PUFA selected from the group consisting of docosahexaenoic acid (DHA), eicosapentaenoic acid (EPA), alpha-linolenic acid (ALA), linoleic acid (LA), arachidonic acid (ARA), and combinations thereof. In one embodiment, the nutritional supplement powder includes DHA. In certain embodiments, the nutritional supplement powder provides, per serving, from about 1 mg to about 15 mg of PUFAs, including from about 5 mg to about 12 mg of PUFAs, and also including about 10 mg of PUFAs. It should be understood that the amount of PUFAs present in the nutritional supplement powder may be provided by any one or more of the PUFAs described herein.

It is known that PUFAs are susceptible to oxidation, which can result in fishy, painty, or otherwise rancid off-flavors and aromas. To provide protection against this oxidation and the resulting off-flavors and aromas, the PUFA utilized in the certain embodiments of the nutritional supplement powder may be an encapsulated PUFA. In certain embodiments, the nutritional supplement powder comprises encapsulated DHA. In certain embodiments, the nutritional supplement powder comprises, per serving, about 10 mg of DHA that is provided by encapsulated DHA.

The nutritional supplement powder described herein provides a good source of vitamins and minerals. In certain embodiments, the nutritional supplement powder comprises vitamins selected from the group consisting of vitamin A, vitamin D, vitamin E, vitamin K, vitamin B1, vitamin B3, pantothenic acid, vitamin B6, vitamin B12, biotin, and combinations thereof. The vitamin A, vitamin D, vitamin E, and vitamin K may be provided as a water dispersible mix to improve dispersibility and prevent separation. In certain embodiments, the nutritional supplement powder comprises minerals selected from the group consisting of calcium, magnesium, phosphorus, selenium, chromium, chloride, molybdenum, manganese, and combinations thereof. In certain embodiments, the nutritional supplement powder provides, per serving, about 10% of the Daily Value (DV) for each of vitamin A (~500 IU), vitamin D (~40 IU), vitamin E (~3 IU), vitamin K (~8 mg), vitamin B1 (~0.15 mg), vitamin B3 (~2 mg NE), pantothenic acid (~1 mg), vitamin B6 (~0.2 mg), vitamin B12 (~0.6 mcg), biotin (~30 mcg), calcium (~100 mg), magnesium (~40 mg), phosphorus (~100 mg), selenium (~7 mcg), chromium (~12 mcg), molybdenum (~7.5 mcg), and manganese (~0.2 mg). In addition to being important nutrients, the aforementioned vitamins and minerals exhibit a neutral flavor and color when utilized in the nutritional supplement powder.

As mentioned above, the nutritional supplement powder is essentially free of divalent ions of copper, iron, and zinc. It was discovered that these particular metal ions imparted a strong metallic flavor to the nutritional supplement powder, and thus, sources of these metal ions were eliminated to achieve a more neutral flavor. In addition, it was discovered that eliminating divalent ions of copper, iron, and zinc minimized the oxidation of PUFAs in nutritional supplement powders containing one or more PUFAa, as well as the off-flavors resulting from such oxidation.

The nutritional supplement powder is also essentially free of vitamin C and sources thereof (e.g., ascorbic acid, salts of ascorbic acid). It was discovered that vitamin C, or sources thereof, imparted a strong vitamin flavor to the nutritional supplement powder, and thus, vitamin C and sources thereof were eliminated to achieve a more neutral flavor. Moreover, vitamin C and sources thereof were eliminated to prevent increased acidity, which can impart a sour flavor.

The various combination of ingredients in the nutritional supplement powder cooperate together to achieve a substantially colorless, flavorless powder. As used herein, the term "substantially colorless" refers to a Hunter L value of at least about 85. Accordingly, in certain exemplary embodiments, the nutritional supplement powder has a Hunter L value of at least about 85, including from about 85 to about 100, from about 85 to about 95, including from about 90 to about 95, and also including from about 95 to about 100. As discussed above, the nutritional supplement powder is essentially free of divalent ions of copper, iron, and zinc, as well as vitamin C, to eliminate the off-flavors associated with these components. In certain embodiments, the nutritional supplement powder is essentially free of sodium and potassium sources to eliminate the salty flavor typically associated with such sodium and potassium sources. Furthermore, in certain embodiments, the nutritional supplement powder is essentially free of carotenoids, folic acid, and vitamin B2, as such components were found to impart an orange-yellow color to the nutritional supplement powder.

The nutritional supplement powder also provides a good source of fiber. In certain embodiments, the nutritional supplement powder provides, per serving, from about 1.25 grams to about 4.5 grams of fiber, including from about 2 grams to about 4 grams of fiber, and also including about 3 grams of fiber. Suitable fiber for use in the nutritional supplement powder includes, but is not limited to, fructooligosaccharide, modified corn and wheat dextrins (e.g., Nutriose® from Roquette (France); Fibersol-2® from ADM/Matsutani, LLC (Iowa, USA)) and inulin, as well as combinations of these fibers.

To accommodate the addition of the nutritional supplement powder into a single serving of a food or beverage, and yet not substantially change the organoleptic properties of the food or beverage, the nutritional supplement powder is formulated to have a small serving size. In certain embodiments, a single serving size of the nutritional supplement powder is from about 5 grams to about 15 grams, including from about 8 grams to about 12 grams, and also including about 10.4 grams. The nutritional supplement powder can be provided in single serving packaging (e.g., single-serve "on the go" stick packages) or multi-serving packaging, such as a bulk container provided with a measuring scoop.

In certain embodiments, the nutritional supplement powder has a caloric density ranging from about 2.5 kcal/gram to about 4 kcal/gram. In certain embodiments, a single serving size of about 5 grams to about 15 grams of the nutritional supplement powder has less than about 60 kcal. In certain other embodiments, a single serving size of about 5 grams to about 15 grams of the nutritional supplement powder has less than about 50 kcal. In yet other embodiments, a single serving size of about 5 grams to about 15 grams of the nutritional supplement powder has less than about 40 kcal.

In certain embodiments, the nutritional supplement powder has a water solubility of at least about 70%. In certain other embodiments, the nutritional supplement powder has a water solubility of at least about 80%. The water solubility may be evaluated by gravimetric determination of the pellet weight (dried) obtained upon centrifugation (31,000×g; 20° C.; 3 hours) of a 10% (w/w) suspension of the nutritional supplement powder in water. Such solubility enhances the ability of the nutritional supplement powder to be added to a food or beverage without substantially changing the organoleptic properties of the food or beverage.

The nutritional supplement powder may contain other optional ingredients so long as they do not adversely affect the desirable properties of the nutritional supplement powder, such as the substantially colorless and neutral flavor characteristics of the powder.

The nutritional supplement powder may be prepared utilizing conventional methods known to those of skill in the art. For example, the nutritional supplement powder may be prepared by dry blending the powdered ingredients in a conventional blender, such as a ribbon blender, paddle blender, or plow blender. In one exemplary embodiment, the nutritional supplement powder is prepared according to the following recipe: (1) dry blending together milk protein concentrate, an amount of fructooligosaccharide (FOS) equal to the amount of milk protein concentrate, vitamins, minerals, and encapsulated DHA until homogenous; (2) adding the remaining FOS to the mixture and continue blending; and (3) adding agglomerated whey protein concentrate to the mixture and blending the whole mixture on a gentle setting (so as to avoid degradation of the agglomerates) until homogenous. In certain embodiments, the dispersibility of the resulting nutritional supplement powder may be improved further by subjecting the nutritional supplement powder to an agglomeration process, an instantization process (e.g., spray lecithination), or both.

In accordance with another embodiment of the present disclosure, a method of supplementing the nutritional value of a food or beverage is provided. The method comprises adding a nutritional supplement powder to the food or beverage. Adding the nutritional supplement powder to the food or beverage does not substantially change the organoleptic properties of the food or beverage. For example, adding the nutritional supplement powder to the food or beverage does not substantially change the color of the food or beverage. It should be understood that any of the previously described embodiments of the nutritional supplement powder are suitable for use in the methods disclosed herein.

The nutritional supplement powder may be added to a wide variety of foods and beverages to supplement the foods and beverages with a good source of protein, fiber, vitamins, and minerals, and in certain exemplary embodiments, a polyunsaturated fatty acid. In particular, the nutritional supplement powder may be added to foods and beverages that are rich in carbohydrates, such as simple sugars, that are often preferred by children and picky eaters. Thus, the nutritional supplement powder may be used to fill the nutrient gaps in foods and beverages preferred by children and picky eaters.

The nutritional supplement powder may be added to foods that contain various amounts of moisture. For example, in certain embodiments, the nutritional supplement powder is added to a food having a moisture content of about 1% to about 30% by weight of the food, including a moisture content of about 1% to about 20%, a moisture content of about 1% to about 10%, or a moisture content of about 1% to about 5% by weight of the food. One exemplary food having a moisture content of about 1% to about 30% by weight is peanut butter. Other exemplary foods having a moisture content of about 1% to about 30% by weight to which the nutritional supplement powder may be added include, but are not limited to, high fat spreads (e.g., cheese spread, butter, hazelnut spread, almond butter), jams, jellies, coffee creamers, artificial sweeteners (e.g., aspartame, sucralose), and so forth. In certain embodiments, the nutritional supplement powder may be incorporated into a mix (e.g., cake mix, brownie mix, cookie mix, instant noodle mix), which is then baked or otherwise cooked so that the resulting food has a moisture content of about 1% to about 30% by weight.

In certain embodiments, the nutritional supplement powder is added to a food having a moisture content of about 30% to about 90% by weight of the food, including a moisture content of about 40% to about 90%, a moisture content of about 50% to about 90%, a moisture content of about 60% to about 90%, a moisture content of about 70% to about 90%, or a moisture content of about 80% to about 90% by weight of the food. Exemplary foods having a moisture content of about 30% to about 90% by weight include, but are not limited to, macaroni-and-cheese, yogurt, batters, mashed potatoes, soups, grain based porridge, cooked rice dishes, sauces, puddings, pasta, and so forth.

In addition to foods having a variety of water content, the nutritional supplement powder is also suitable for use in foods and beverages of various pH. In certain embodiments, the food or beverage has a pH of about 2 to about 4.6 before the nutritional supplement powder is added. For example, the nutritional supplement powder may be added to foods and beverages such as tomato soup, yogurt, applesauce, fruit juice, vegetable juice, artificial juice drinks, smoothies, kefir, kombucha, and so forth. In certain other embodiments, the food or beverage has a pH of about 4.6 to about 8 before the nutritional supplement powder is added. For instance, the nutritional supplement powder may be added to foods and beverages such as mashed potatoes, farina, peanut butter, fruit puree, vegetable puree, soups, stews, milk, milk containing beverages, cereal based beverages (e.g., soy based beverages, wheat based beverages), breakfast cereals (e.g., prepared oatmeal), and so forth.

After adding the nutritional supplement powder to the food or beverage, the food or beverage may be stirred or mixed for about 30 seconds to about 60 seconds to disperse the powder homogenously throughout the food or beverage. To minimize the impact of the nutritional supplement powder on the organoleptic properties (e.g., appearance, texture, taste, mouthfeel) of the food or beverage, the nutritional supplement powder is formulated to provide supplemental nutrients via a small serving size. For example, in certain embodiments, a single serving size of about 5 grams to about 15 grams of the nutritional supplement powder is added to a single serving of the food or beverage. In certain other embodiments, a single serving size of about 10.4 grams of the nutritional supplement powder is added to a single serving of the food or beverage.

In addition to the small serving size, the solubility and dispersibility of the nutritional supplement powder allow the powder to be added to and mixed with a variety of foods and beverages without substantially changing the organoleptic properties of the foods and beverages. As previously mentioned, the nutritional supplement powder, in certain embodiments, has a water solubility of at least 70%, including at least 80%, which ensures that the powder adequately dissolves in the food or beverage. Moreover, the use of agglomerated protein in certain embodiments of the nutritional supplement powder promotes dispersion of the powder throughout the food or beverage and minimizes clumping.

The following examples illustrate certain exemplary embodiments of the nutritional supplement powders and methods described herein. The examples are given solely for the purpose of illustration and are not to be construed as limiting of the present disclosure, as many variations thereof are possible without departing from the spirit and scope of the present disclosure.

Example 1

Example 1 illustrates an exemplary embodiment of the nutritional supplement powder described herein. All ingredient amounts listed in Example 1 are listed as gram per 1000 g batch of the nutritional supplement powder, unless otherwise indicated.

TABLE 1

| INGREDIENTS | Example 1 Amount (g/1000 g) |
|---|---|
| Agglomerated Whey Protein Concentrate | 564.07 |
| Short Chain Fructooligosaccharides | 313.37 |
| Milk Protein Concentrate | 62.68 |
| Magnesium Phosphate | 27.67 |
| Tri Calcium Phosphate, micronized | 19.28 |
| Docosahexaenoic Acid | 9.64 |
| Water Dispersible Vitamin A, D, E, K premix | 1.93 |
| Vitamin/Mineral premix* | 1.35 |

*The Vitamin/Mineral premix includes Vitamin B1, Vitamin B3, Vitamin B5, Vitamin B6, Vitamin B12, Biotin, Calcium, Magnesium, Phosphorus, Chromium, Manganese, Molybdenum, and Selenium.

Example 2

Example 2 illustrates an exemplary embodiment of the nutritional supplement powder described herein. All ingredient amounts listed in Example 2 are listed as gram per 1000 g batch of the nutritional supplement powder, unless otherwise indicated.

TABLE 2

| INGREDIENTS | Example 2 Amount (g/1000 g) |
|---|---|
| Agglomerated Whey Protein Concentrate | 569.57 |
| Short Chain Fructooligosaccharides | 316.42 |
| Milk Protein Concentrate | 63.29 |
| Magnesium Phosphate | 27.94 |
| Tri Calcium Phosphate, micronized | 19.47 |
| Water Dispersible Vitamin A, D, E, K premix | 1.95 |
| Vitamin/Mineral premix* | 1.36 |

*The Vitamin/Mineral premix includes Vitamin B1, Vitamin B3, Vitamin B5, Vitamin B6, Vitamin B12, Biotin, Calcium, Magnesium, Phosphorus, Chromium, Manganese, Molybdenum, and Selenium.

Example 3

Example 3 illustrates the dietary values of the nutritional supplement powder described in Example 1. The amounts listed in Table 3 are based on a serving size of 10.4 grams of the nutritional supplement powder.

TABLE 3

| Dietary Values | Amount |
|---|---|
| Serving Size, g | 10.4 |
| Calories, kcal | 33 |
| Protein, g | 5 |
| Carbohydrates, g | 4 |
| Fiber, g | 3 |
| Sugars, g | N/A |
| Fat, g | <0.4 |
| Docosahexaenoic Acid, mg | 10 |
| Vitamins | |
| Vitamin B1, mg | 0.15 |
| Vitamin B3, mg NE | 2.0 |
| Pantothenic Acid, mg | 1.0 |
| Vitamin B6, mg | 0.2 |
| Vitamin B12, mcg | 0.6 |
| Biotin, mcg | 30 |
| Vitamin A, IU | 500 |
| Vitamin D, IU | 40 |
| Vitamin E, IU | 3.0 |
| Vitamin K, mg | 8.0 |
| Minerals | |
| Calcium, mg | 100 |
| Phosphorus, mg | 100 |

TABLE 3-continued

| Dietary Values | Amount |
| --- | --- |
| Magnesium, mg | 40 |
| Chromium, mcg | 12 |
| Manganese, mg | 0.2 |
| Molybdenum, mcg | 7.5 |
| Selenium, mcg | 7.0 |

Example 4

Example 4 illustrates various physical properties of the nutritional supplement powder described in Example 1. The various physical properties and values are shown in Table 4 below for the nutritional supplement powder and the reconstituted nutritional supplement powder.

TABLE 4

| Property Evaluated | Units or Scale | Value |
| --- | --- | --- |
| Hunter a | | −1.14 |
| Hunter b | | 14.04 |
| Hunter L | | 89.60 |
| Loose Bulk Density | g/cc | 0.450 |
| Vibrated Bulk Density | g/cc | 0.551 |
| Particle Size | μm | 115.1 |
| Oxygen | % | 4.3 |
| Powder Wettability | seconds | 120.0 |
| Dispersibility | 0-6 | 0 |
| Reconstituted* Hunter a | | −2.34 |
| Reconstituted* Hunter b | | 14.05 |
| Reconstituted* Hunter L | | 79.64 |
| Reconstituted* pH | 1-14 | 6.40 |
| Reconstituted* Sedimentation Bottom | 1-6 | 3 |
| Reconstituted* Sedimentation Top | 1-6 | 0 |
| Reconstituted* Slide Grain | 1-6 | 6** |
| Reconstituted* Viscosity | centipoise | 2.40 |

*Reconstitution rate was 10 grams powder in 90 grams water.
**Although the slide grain was high, the nutritional supplement powder is not intended to impart body, nor is it intended to be reconstituted in water.

The nutritional supplement powder was very light in color, as noted by the Hunter L value of 89.6 (a Hunter L value of 0 corresponds to black, while a Hunter L value of 100 corresponds to diffuse white).

Dispersibility of the nutritional supplement powder was evaluated using a visual evaluation with a scale of 0-6 that rates undissolved powder residue after reconstitution remaining on a 5 inch diameter 80 mesh screen. A score of 0 corresponds to a powder that dissolves completely with no residue and a score of 6 is a powder that does not dissolve well with significant residue. The method specifies the amount of powder to be added to 180 mL of 105° F. water, which is then placed in an eight ounce bottle with a lid and shaken moderately for 30 seconds. The contents of the bottle are then emptied into a 5 inch diameter 80 mesh screen. Several handfuls of tap water are then used to wash away foam through the screen to expose remaining undissolved particles or gel particles. A score of 4 corresponds to approximately 25% of the 80 mesh screen having undissolved particles. A score of 5 or greater corresponds to approximately 40% or more of the screen having undissolved particles. As seen from Table 4, the nutritional supplement powder exhibited excellent dispersibility with a score of 0.

Example 5

Example 5 illustrates the sensory performance of the nutritional supplement powder as described in Example 1. In this example, the sensory characteristics of test samples of macaroni-and-cheese with the nutritional supplement powder mixed in and strawberry flavored yogurt with the nutritional supplement powder mixed in were compared to control samples of macaroni-and-cheese and strawberry flavored yogurt. Details of the test and control samples are provided in Table 5.

TABLE 5

| Control Samples | Preparation of Control Samples |
| --- | --- |
| Macaroni-and-Cheese | Kraft Macaroni & Cheese Dinner-Prepared with ¼ cup of 2% milk and ¼ cup of salted butter. |
| Strawberry Flavored Yogurt | Yoplait Original Smooth Style Strawberry Flavored Low Fat Yogurt. |
| Test Samples | Preparation of Test Samples |
| Macaroni-and-Cheese with Nutritional Supplement Powder | Kraft Macaroni & Cheese Dinner-Prepared with ¼ cup of 2% milk and ¼ cup of salted butter. 300 grams of prepared sample mixed with 15.6 grams of the nutritional supplement powder. |
| Strawberry Flavored Yogurt with Nutritional Supplement Powder | Yoplait Original Smooth Style Strawberry Flavored Low Fat Yogurt. 1 serving = 170 grams of yogurt mixed with 10.4 grams of the nutritional supplement powder. |

A panel of certified flavor profilers evaluated the samples for the intensity of various tastes and characteristics. For example, with respect to the macaroni-and-cheese samples, the profilers provided scores for the following characteristics: salt, sour, sweet, butter, processed cheese (cheddar), cooked pasta, slippery mouthfeel, albumin/gelatin, barny/caseinate, and appearance. For the strawberry flavored yogurt, the profilers provided scores for the following characteristics: sweet, sour, strawberry (fresh, candy), dairy (yogurt/cultured), drying, astringent, starchy, albumin/gelatin, and appearance. The macaroni-and-cheese samples were tasted by the panelists at a temperature of about 125° F., while the strawberry flavored yogurt samples were tasted by the panelists at a temperature of about 34° F. After tasting, each panelist assessed the various characteristics of the sample using a scoring system set forth in Table 6 below and the results were then averaged. The results are shown in Table 7.

TABLE 6

| Scale | Description |
| --- | --- |
| )( | Threshold |
| 1/2 | Very Slight |
| 1 | Slight |
| 1½ | Slight to Moderate |
| 2 | Moderate |
| 2½ | Moderate to Strong |
| 3 | Strong |

TABLE 7

| Macaroni-and-Cheese | Control Sample Score | Test Sample Score |
| --- | --- | --- |
| Salt | 1 | 1 |
| Sour | 1 | 1 |
| Sweet | ½ | 1 |
| Butter | 1 | ½ |
| Processed Cheese (cheddar) | 1½ | 1 |
| Cooked Pasta | 1 | 1 |

TABLE 7-continued

| Strawberry Flavored Yogurt | Control Sample | Test Sample |
|---|---|---|
| Slippery Mouthfeel | 1½ | 1½ |
| Albumin/Gelatin | — | 1½ |
| Barny/Caseinate | — | ½ |
| Appearance | typical appearance of macaroni-and-cheese | no notable difference |

| Strawberry Flavored Yogurt | Control Sample | Test Sample |
|---|---|---|
| Sweet | 1½ | 1½ |
| Sour | 1½ | 1 |
| Strawberry (fresh, candy) | 1½ | 1 |
| Dairy (yogurt/cultured) | 1½ | 1 |
| Drying | 1 | 1 |
| Astringent | 1 | ½ |
| Starchy | — | 1 |
| Albumin/gelatin | — | 1½ |
| Appearance | pink | muted pink |

Example 6

Example 6 illustrates the hedonic responses of a panel of children to food containing the nutritional supplement powder according to Example 1 compared to the same food without the nutritional supplement powder. The foods utilized in the present example were macaroni-and-cheese and strawberry flavored yogurt, and the control samples and test samples of the foods correspond to those described in Table 5 of Example 5.

Testing Protocol for Example 6

A total of 48 children (ages 4-10 years) served as the panelists for the hedonic evaluation of the foods. The panelists were asked to rate overall acceptability of the food sample on a 5-point Hedonic scale (1=Do not like at all, 5=Like Very Much). The panelists were also asked to select the food sample they preferred. Testing was conducted as interviews with the panelists. Water was used to rinse the mouth between each tasting of the samples.

The macaroni-and-cheese was prepared following box instructions. Fresh batches of macaroni-and-cheese were prepared every 10 minutes. Samples were held warm in glass beakers submersed in a hot water bath (60° C.). The macaroni-and-cheese was served between 120° F. and 125° F. Panelists were served approximately 1½ tablespoons of each sample. Samples were served in 5 ounce Styrofoam squat cups coded with 3-digit random numbers.

The yogurt was mixed every 15-20 minutes to maintain freshness. Samples were kept refrigerated. Panelists were served approximately 1 teaspoon of product in 2 ounce plastic cups coded with 3-digit random numbers.

The samples were presented using a Balanced Complete Block Design of all possible orders and combinations. Analysis of Variance and the Fisher LSD test were used to analyze the hedonic data. Preference was determined using a 2-sample binomial test for preference (2-tailed). Significance was determined at the 95% confidence level.

Results

The results of the testing, including an "overall liking" score and preference, are presented below in Table 8.

TABLE 8

| Macaroni-and-Cheese | Average Overall Liking* (n = 48) | Preference** (n = 45) |
|---|---|---|
| Control Sample | 4.40 | 30 |
| Test Sample (control with nutritional supplement powder) | 4.27 | 15 |
| p value | 0.437 | 0.03 |
| LSD | n/a | n/a |
| Scale | 1 = Do Not Like at All | |
| | 5 = Like Very Much | |

| Strawberry Flavored Yogurt | Average Overall Liking* (n = 48) | Preference** (n = 46) |
|---|---|---|
| Control Sample | 4.27 | 34 |
| Test Sample (control plus nutritional supplement powder) | 3.88 | 12 |
| p value | 0.076 | 0.03 |
| LSD | n/a | n/a |
| Scale | 1 = Do Not Like at All | |
| | 5 = Like Very Much | |

*Average Overall Liking scores for control sample and test sample were not significantly different at the 95% confidence level.
**Preference scores for the control sample and test sample were significantly different at the 95% confidence level.

The results of the hedonic testing indicate that the addition of the nutritional supplement powder did not significantly affect the overall liking scores for the macaroni-and-cheese or the strawberry flavored yogurt compared to the control samples. On the other hand, there was a significant preference for the control samples.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the term "in" or "into" is used in the specification or the claims, it is intended to additionally mean "on" or "onto," respectively.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the present disclosure.

What is claimed is:

1. A nutritional supplement powder comprising:
    a protein system, a polyunsaturated fatty acid, vitamins, minerals, and fiber;
    wherein the protein system has a water solubility of at least about 70% at room temperature;
    wherein the vitamins comprise at least one of vitamin A, vitamin D, vitamin E, vitamin K, vitamin B1, vitamin B3, vitamin B6, and vitamin B12;
    wherein the minerals comprise at least one of calcium, magnesium, phosphorus, selenium, chromium, molybdenum, and manganese; and
    wherein the nutritional supplement powder is essentially free of (i) divalent ions of copper, iron, and zinc; and (ii) vitamin C.

2. The nutritional supplement powder of claim 1, wherein the protein system comprises whey protein concentrate and milk protein concentrate.

3. The nutritional supplement powder of claim 2, wherein a weight ratio of the whey protein concentrate to the milk protein concentrate ranges from about 50:50 to about 90:10.

4. The nutritional supplement powder of claim 2, wherein a weight ratio of the whey protein concentrate to the milk protein concentrate is about 90:10.

5. The nutritional supplement powder of claim 2, wherein the whey protein concentrate is agglomerated whey protein concentrate and the milk protein concentrate is agglomerated milk protein concentrate.

6. The nutritional supplement powder of claim 1, wherein the amount of the protein system ranges from about 15 grams to about 20 grams per 100 kcal of the nutritional supplement powder.

7. The nutritional supplement powder of claim 1, wherein the polyunsaturated fatty acid comprises at least one of docosahexaenoic acid, eicosapentaenoic acid, alpha-linolenic acid, linoleic acid, gamma-linolenic acid, and arachidonic acid.

8. The nutritional supplement powder of claim 1, wherein the polyunsaturated fatty acid comprises encapsulated docosahexaenoic acid.

9. The nutritional supplement powder of claim 1, wherein the fiber comprises at least one of fructooligosaccharide, modified corn dextrin, modified wheat dextrin, and inulin.

10. The nutritional supplement powder of claim 1, wherein a single serving size of about 5 grams to about 15 grams of the nutritional supplement powder has less than about 60 kcal.

11. The nutritional supplement powder of claim 1, wherein a caloric density of the nutritional supplement powder ranges from about 2.5 kcal/gram to about 4 kcal/gram.

12. The nutritional supplement powder of claim 1, wherein the nutritional supplement powder has a water solubility of at least about 70%.

13. The nutritional supplement powder of claim 1, wherein the nutritional supplement powder has a Hunter L value of at least about 85.

14. A method of supplementing the nutritional value of a food or beverage, the method comprising:
   adding a nutritional supplement powder to the food or beverage, the nutritional supplement powder comprising:
   a protein system, a polyunsaturated fatty acid, vitamins, minerals, and fiber;
   wherein the protein system has a water solubility of at least about 70% at room temperature;
   wherein the vitamins comprise at least one of vitamin A, vitamin D, vitamin E, vitamin K, vitamin B1, vitamin B3, vitamin B6, and vitamin B12;
   wherein the minerals comprise at least one of calcium, magnesium, phosphorus, selenium, chromium, molybdenum, and manganese;
   wherein the nutritional supplement powder is essentially free of (i) divalent ions of copper, iron, and zinc; and (ii) vitamin C; and
   wherein the nutritional supplement powder does not substantially change the organoleptic properties of the food or beverage.

15. The method of claim 14, wherein the protein system comprises whey protein concentrate and milk protein concentrate.

16. The method of claim 14, wherein the food has a moisture content of about 1% to about 30% by weight of the food.

17. The method of claim 14, wherein the food has a moisture content of about 30% to about 90% by weight of the food.

18. The method of claim 14, wherein a single serving size of about 5 grams to about 15 grams of the nutritional supplement powder is added to the food or beverage.

19. The method of claim 14, wherein the nutritional supplement powder does not substantially change the color of the food or beverage.

20. A nutritional supplement powder comprising:
   a protein system, vitamins, minerals, and fiber;
   wherein the vitamins comprise at least one of vitamin A, vitamin D, vitamin E, vitamin K, vitamin B1, vitamin B3, vitamin B6, and vitamin B12;
   wherein the minerals comprise at least one of calcium, magnesium, phosphorus, selenium, chromium, molybdenum, and manganese; and
   wherein the nutritional supplement powder is essentially free of (i) divalent ions of copper, iron, and zinc; and (ii) vitamin C.

* * * * *